(12) United States Patent
Fagundes (10) Patent No.: US 11,502,862 B2
(45) Date of Patent: Nov. 15, 2022

(54) CUSTOM COMMUNICATION ACTIONS BASED ON ENVIRONMENT ANALYSIS

(71) Applicant: Avaya Inc., Santa Clara, CA (US)

(72) Inventor: Luciano Godoy Fagundes, Sao Paulo (BR)

(73) Assignee: Avaya Inc., Santa Clara, CA (US)

( * ) Notice: Subject to any disclaimer, the term of this patent is extended or adjusted under 35 U.S.C. 154(b) by 0 days.

(21) Appl. No.: 16/122,162

(22) Filed: Sep. 5, 2018

(65) Prior Publication Data

US 2020/0076635 A1 Mar. 5, 2020

(51) Int. Cl.
*H04L 12/18* (2006.01)
*H04M 3/56* (2006.01)
*G06V 40/16* (2022.01)

(52) U.S. Cl.
CPC ........ *H04L 12/1822* (2013.01); *G06V 40/172* (2022.01); *H04M 3/567* (2013.01)

(58) Field of Classification Search
CPC ............ H04L 12/1822; H04L 12/1818; H04M 3/567; H04M 2250/62; H04M 1/72569; H04M 3/432; H04M 3/58; H04M 3/563; G06K 9/00288
USPC .............................. 455/410, 414.1, 415–418
See application file for complete search history.

(56) References Cited

U.S. PATENT DOCUMENTS

| | | | |
|---|---|---|---|
| 6,928,279 B2 | 8/2005 | Seligmann et al. | |
| 6,950,651 B2 | 9/2005 | Seligmann | |
| 7,013,003 B2 | 3/2006 | Seligmann | |
| 7,162,256 B2 | 1/2007 | Seligmann et al. | |
| 7,392,048 B2 | 6/2008 | Seligmann et al. | |
| 7,397,787 B2 | 7/2008 | Seligmann | |
| 7,421,072 B2 | 9/2008 | Brotman et al. | |
| 7,616,624 B2 | 11/2009 | John et al. | |
| 8,571,541 B2 | 10/2013 | Seligmann et al. | |
| 2003/0073430 A1* | 4/2003 | Robertson | H04M 1/724 455/416 |
| 2004/0203664 A1* | 10/2004 | Lei | H04M 3/53 455/414.1 |
| 2007/0140532 A1* | 6/2007 | Goffin | G06K 9/00288 382/118 |
| 2011/0043643 A1* | 2/2011 | Yu | H04N 1/00209 348/207.1 |
| 2012/0278078 A1* | 11/2012 | Ricci | G10L 15/22 704/251 |

(Continued)

*Primary Examiner* — Michael Y Mapa
(74) *Attorney, Agent, or Firm* — Sheridan Ross P.C.

(57) ABSTRACT

According to one embodiment, facilitating communications through a communication device can comprise monitoring, by the communication device, one or more environmental sensors of the communication device including at least one sensor collecting biometric information. A presence of one or more people can be detected by the communication device based on the monitoring or the one or more environmental sensors and the detected one or more people can be identified by the communication device based at least in part on input from the one or more environmental sensors. One or more possible actions related to communications through the communication device can be determined by the communication device based on the identified one or more people. A user interface including a prompt for at least one of the determined one or more possible actions related to communications through the communication device can then be provided.

9 Claims, 4 Drawing Sheets

(56) References Cited

U.S. PATENT DOCUMENTS

| | | | |
|---|---|---|---|
| 2013/0283185 A1* | 10/2013 | Mock | G06Q 10/103 |
| | | | 715/746 |
| 2014/0011487 A1* | 1/2014 | Hwang | G06V 40/16 |
| | | | 455/556.1 |
| 2014/0055553 A1* | 2/2014 | Lee | G06V 10/95 |
| | | | 348/14.07 |
| 2016/0072956 A1* | 3/2016 | Chizi | H04M 3/563 |
| | | | 455/416 |
| 2019/0268460 A1* | 8/2019 | Agrawal | H04W 4/021 |

* cited by examiner

CUSTOM COMMUNICATION ACTIONS BASED ON ENVIRONMENT ANALYSIS

FIELD OF THE DISCLOSURE

Embodiments of the present disclosure relate generally to methods and systems for facilitating communications through a communication device and more particularly to providing options for initiating or conducting communications through a communication device based on monitoring and analysis of surroundings of the communication device.

BACKGROUND

Currently, communication endpoints, such as telephones, cellular phones, and/or other wired or wireless communication devices, already offer ways to setup and complete a call, transfer, conference, or other communication. However, they all have been thought about from a stationary perspective where the user is alone and wants to interact with someone in another office, building, city, etc. To do so, there is a set of steps that needs to be followed such as entering the address book, searching for the person, click to dial, etc. For a conference or transfer even more steps are required.

As such, the previous solutions require too many steps. For instance, someone working at a jobsite, such as a field agent, may receive a call from a customer and may need help from an expert. This agent can, while carrying his mobile phone, go to an onsite location, such as a lab, engineering office, etc., find an expert and ask him or her for help. If the expert is available and agrees to help, the agent will need to get his or her phone number or search for the contact information in an address book, click the contact information or other interface element(s) to call, press a feature button to get the expert to join the call, etc. This was OK when the agent was seating on his/her desk and was just calling a pool of experts. However, this becomes inefficient when the expert is relatively nearby, perhaps already standing in front of the agent, in the same room or building, etc. Hence, there is a need for improved methods and systems for facilitating communications through a communication device.

BRIEF SUMMARY

Embodiments of the disclosure are directed to systems and methods for providing options for initiating or conducting communications through a communication device based on monitoring and analysis of surroundings of the communication device. Generally speaking, embodiments described herein can take advantage of multiple sensors inside the communication devices, use that input to sense the people around the device, and provide shortcuts that would allow the user of the device to take action. The input from these sensors can capture, among other things, biometric information for persons near the device. For example, a camera such as typically found on communication devices can capture video and still images of people nearby. Similarly, a microphone can capture audio of people speaking. These images, video, and/or audio signals can be processed to detect and identify people nearby. Once identified, a shortcut button or other user interface element can be presented on the user interface of the communication device to facilitate communications with one or more of those detected and identified people. For example, options can be presented to call an identified person, transfer an ongoing call to an identified person, invite an identified person to join a conference call, etc.

According to one embodiment, a method for facilitating communications through a communication device can comprise monitoring, by the communication device, one or more environmental sensors of the communication device. The one or more environmental sensors can comprise at least one sensor collecting biometric information. A presence of one or more people can be detected by the communication device based on the monitoring or the one or more environmental sensors and the detected one or more people can be identified by the communication device based at least in part on input from the one or more environmental sensors. One or more possible actions related to communications through the communication device can be determined by the communication device based on the identified one or more people. A user interface including a prompt for at least one of the determined one or more possible actions related to communications through the communication device can then be provided.

For example, the determined one or more possible actions related to communications through the communication device can comprise initiating a call to at least one of the identified one or more people, inviting at least one of the identified one or more people to join a conference, or transferring a call to at least one of the identified one or more people. The at least one sensor collecting biometric information can comprise, for example, a camera providing video or still images and identifying one or more people based at least in part on input from the one or more environmental sensors can comprise performing facial recognition on the video or still images. Additionally, or alternatively, the at least one sensor collecting biometric information can comprise a microphone providing an audio stream and identifying one or more people based at least in part on input from the one or more environmental sensors can comprise performing voice recognition on the audio stream.

In some cases, the communication device can also monitor activity of a user of the communication device. For example, the activity of the user of the communication device can comprise an ongoing communication with another person. A communication context for the user of the communication device can be determined based on monitoring the activity of the user of the communication device. In such cases, determining the one or more possible actions related to communications through the communication device and providing the user interface including the prompt for the at least one of the determined one or more possible actions can be further based on the determined communication context for the user of the communication device.

According to another embodiment, a communication device can comprise one or more environmental sensors including at least one sensor collecting biometric information, a processor, and a memory coupled with and readable by the processor. The memory can store therein a set of instructions which, when executed by the processor, causes the processor to facilitate communications through the communication device by monitoring the one or more environmental sensors, detecting a presence of one or more people based on the monitoring or the one or more environmental sensors, identifying the detected one or more people based at least in part on input from the one or more environmental sensors, determining one or more possible actions related to communications through the communication device based on the identified one or more people, and providing a user interface including a prompt for at least one of the determined one or more possible actions related to communications through the communication device. In some cases, the instructions can further cause the processor to monitor activity of a user of the communication device and determine a communication context for the user of the communication device based on monitoring the activity of the user of the communication device. In such cases, determining the one or more possible actions related to communications through the communication device and providing the user interface including the prompt for the at least one of the determined one or more possible actions can be further based on the determined communication context for the user of the communication device.

For example, the activity of the user of the communication device can comprise an ongoing communication with another person. Determined one or more possible actions related to communications through the communication device can comprise, for example, initiating a call to at least one of the identified one or more people, inviting at least one of the identified one or more people to join a conference, or transferring a call to at least one of the identified one or more people. In some cases, the at least one sensor collecting biometric information can comprise a camera providing video or still images and identifying one or more people based at least in part on input from the one or more environmental sensors can comprise performing facial recognition on the video or still images. Additionally, or alternatively, the at least one sensor collecting biometric information can comprise a microphone providing an audio stream and identifying one or more people based at least in part on input from the one or more environmental sensors can comprise performing voice recognition on the audio stream.

According to yet another embodiment, a non-transitory, computer-readable medium can comprise a set of instructions stored therein which, when executed by a processor, causes the processor to facilitate communications through a communication device by monitoring the one or more environmental sensors, detecting a presence of one or more people based on the monitoring or the one or more environmental sensors, identifying the detected one or more people based at least in part on input from the one or more environmental sensors, determining one or more possible actions related to communications through the communication device based on the identified one or more people, and providing a user interface including a prompt for at least one of the determined one or more possible actions related to communications through the communication device. In some cases, the instructions can further cause the processor to monitor activity of a user of the communication device and determine a communication context for the user of the communication device based on monitoring the activity of the user of the communication device. Determining the one or more possible actions related to communications through the communication device and providing the user interface including the prompt for the at least one of the determined one or more possible actions can be further based on the determined communication context for the user of the communication device.

The determined one or more possible actions related to communications through the communication device can comprise, for example, initiating a call to at least one of the identified one or more people, inviting at least one of the identified one or more people to join a conference, or transferring a call to at least one of the identified one or more people. In some cases, the at least one sensor collecting biometric information can comprise a camera providing video or still images and wherein identifying one or more people based at least in part on input from the one or more environmental sensors can comprise performing facial recognition on the video or still images. Additionally, or alternatively, the at least one sensor collecting biometric information can comprise a microphone providing an audio stream and wherein identifying one or more people based at least in part on input from the one or more environmental sensors can comprise performing voice recognition on the audio stream.

In the appended figures, similar components and/or features may have the same reference label. Further, various components of the same type may be distinguished by following the reference label by a letter that distinguishes among the similar components. If only the first reference label is used in the specification, the description is applicable to any one of the similar components having the same first reference label irrespective of the second reference label.

DETAILED DESCRIPTION

In the following description, for the purposes of explanation, numerous specific details are set forth in order to provide a thorough understanding of various embodiments disclosed herein. It will be apparent, however, to one skilled in the art that various embodiments of the present disclosure may be practiced without some of these specific details. The ensuing description provides exemplary embodiments only, and is not intended to limit the scope or applicability of the disclosure. Furthermore, to avoid unnecessarily obscuring the present disclosure, the preceding description omits a number of known structures and devices. This omission is not to be construed as a limitation of the scopes of the claims. Rather, the ensuing description of the exemplary embodiments will provide those skilled in the art with an enabling description for implementing an exemplary embodiment. It should however be appreciated that the present disclosure may be practiced in a variety of ways beyond the specific detail set forth herein.

While the exemplary aspects, embodiments, and/or configurations illustrated herein show the various components of the system collocated, certain components of the system can be located remotely, at distant portions of a distributed network, such as a Local-Area Network (LAN) and/or Wide-Area Network (WAN) such as the Internet, or within a dedicated system. Thus, it should be appreciated, that the components of the system can be combined in to one or more devices or collocated on a particular node of a distributed network, such as an analog and/or digital telecommunications network, a packet-switch network, or a circuit-switched network. It will be appreciated from the following description, and for reasons of computational efficiency, that the components of the system can be arranged at any location within a distributed network of components without affecting the operation of the system.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire and fiber optics, and may take the form of acoustic or light waves, such as those generated during radio-wave and infra-red data communications.

As used herein, the phrases "at least one," "one or more," "or," and "and/or" are open-ended expressions that are both conjunctive and disjunctive in operation. For example, each of the expressions "at least one of A, B and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising," "including," and "having" can be used interchangeably.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

The term "computer-readable medium" as used herein refers to any tangible storage and/or transmission medium that participate in providing instructions to a processor for execution. Such a medium may take many forms, including but not limited to, non-volatile media, volatile media, and transmission media. Non-volatile media includes, for example, Non-Volatile Random-Access Memory (NVRAM), or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a Compact Disk Read-Only Memory (CD-ROM), any other optical medium, punch cards, paper tape, any other physical medium with patterns of holes, a Random-Access Memory (RAM), a Programmable Read-Only Memory (PROM), and Erasable Programmable Read-Only Memory (EPROM), a Flash-EPROM, a solid state medium like a memory card, any other memory chip or cartridge, a carrier wave as described hereinafter, or any other medium from which a computer can read. A digital file attachment to e-mail or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like. Accordingly, the disclosure is considered to include a tangible storage medium or distribution medium and prior art-recognized equivalents and successor media, in which the software implementations of the present disclosure are stored.

A "computer readable signal" medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, Radio Frequency (RF), etc., or any suitable combination of the foregoing.

The terms "determine," "calculate," and "compute," and variations thereof, as used herein, are used interchangeably and include any type of methodology, process, mathematical operation or technique.

It shall be understood that the term "means" as used herein shall be given its broadest possible interpretation in accordance with 35 U.S.C., Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary of the disclosure, brief description of the drawings, detailed description, abstract, and claims themselves.

Aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Any combination of one or more computer readable medium(s) may be utilized. The computer readable medium may be a computer readable signal medium or a computer readable storage medium.

In yet another embodiment, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as Programmable Logic Device (PLD), Programmable Logic Array (PLA), Field Programmable Gate Array (FPGA), Programmable Array Logic (PAL), special purpose computer, any comparable means, or the like. In general, any device(s) or means capable of implementing the methodology illustrated herein can be used to implement the various aspects of this disclosure. Exemplary hardware that can be used for the disclosed embodiments, configurations, and aspects includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

Examples of the processors as described herein may include, but are not limited to, at least one of Qualcomm® Snapdragon® 800 and 801, Qualcomm® Snapdragon® 610 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARM926EJ-S™ processors, other industry-equivalent processors, and may perform computational functions using any known or future-developed standard, instruction set, libraries, and/or architecture.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or Very Large-Scale Integration (VLSI) design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as program embedded on personal computer such as an applet, JAVA® or Common Gateway Interface (CGI) script, as a resource residing on a server or computer workstation, as a routine embedded in a dedicated measurement system, system component, or the like. The system can also be implemented by physically incorporating the system and/or method into a software and/or hardware system.

Although the present disclosure describes components and functions implemented in the aspects, embodiments, and/or configurations with reference to particular standards and protocols, the aspects, embodiments, and/or configurations are not limited to such standards and protocols. Other similar standards and protocols not mentioned herein are in existence and are considered to be included in the present disclosure. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present disclosure.

Various additional details of embodiments of the present disclosure will be described below with reference to the figures. While the flowcharts will be discussed and illustrated in relation to a particular sequence of events, it should be appreciated that changes, additions, and omissions to this sequence can occur without materially affecting the operation of the disclosed embodiments, configuration, and aspects.

Figure 1:
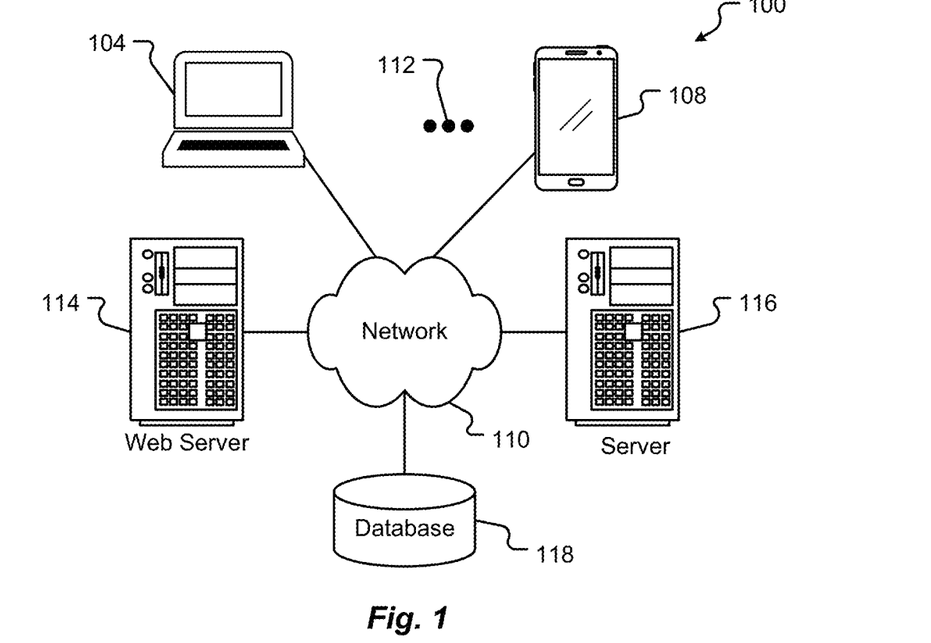
FIG. 1 is a block diagram illustrating elements of an exemplary computing environment in which embodiments of the present disclosure may be implemented.

FIG. 1 is a block diagram illustrating elements of an exemplary computing environment in which embodiments of the present disclosure may be implemented. More specifically, this example illustrates a computing environment 100 that may function as the servers, user computers, or other systems provided and described herein. The environment 100 includes one or more user computers, or computing devices, such as a computing device 104, a communication device 108, and/or more 112. The computing devices 104, 108, 112 may include general purpose personal computers (including, merely by way of example, personal computers, and/or laptop computers running various versions of Microsoft Corp.'s Windows® and/or Apple Corp.'s Macintosh® operating systems) and/or workstation computers running any of a variety of commercially-available UNIX® or UNIX-like operating systems. These computing devices 104, 108, 112 may also have any of a variety of applications, including for example, database client and/or server applications, and web browser applications. Alternatively, the computing devices 104, 108, 112 may be any other electronic device, such as a thin-client computer, Internet-enabled mobile telephone, and/or personal digital assistant, capable of communicating via a network 110 and/or displaying and navigating web pages or other types of electronic documents. Although the exemplary computer environment 100 is shown with two computing devices, any number of user computers or computing devices may be supported.

Environment 100 further includes a network 110. The network 110 may can be any type of network familiar to those skilled in the art that can support data communications using any of a variety of commercially-available protocols, including without limitation Session Initiation Protocol (SIP), Transmission Control Protocol/Internet Protocol (TCP/IP), Systems Network Architecture (SNA), Internetwork Packet Exchange (IPX), AppleTalk, and the like. Merely by way of example, the network 110 maybe a Local Area Network (LAN), such as an Ethernet network, a Token-Ring network and/or the like; a wide-area network; a virtual network, including without limitation a Virtual Private Network (VPN); the Internet; an intranet; an extranet; a Public Switched Telephone Network (PSTN); an infra-red network; a wireless network (e.g., a network operating under any of the IEEE 802.9 suite of protocols, the Bluetooth® protocol known in the art, and/or any other wireless protocol); and/or any combination of these and/or other networks.

The system may also include one or more servers 114, 116. In this example, server 114 is shown as a web server and server 116 is shown as an application server. The web server 114, which may be used to process requests for web pages or other electronic documents from computing devices 104, 108, 112. The web server 114 can be running an operating system including any of those discussed above, as well as any commercially-available server operating systems. The web server 114 can also run a variety of server applications, including SIP servers, HyperText Transfer Protocol (secure)

(HTTP(s)) servers, FTP servers, CGI servers, database servers, Java servers, and the like. In some instances, the web server 114 may publish operations available operations as one or more web services.

The environment 100 may also include one or more file and or/application servers 116, which can, in addition to an operating system, include one or more applications accessible by a client running on one or more of the computing devices 104, 108, 112. The server(s) 116 and/or 114 may be one or more general purpose computers capable of executing programs or scripts in response to the computing devices 104, 108, 112. As one example, the server 116, 114 may execute one or more web applications. The web application may be implemented as one or more scripts or programs written in any programming language, such as Java™, C, C#®, or C++, and/or any scripting language, such as Perl, Python, or Tool Command Language (TCL), as well as combinations of any programming/scripting languages. The application server(s) 116 may also include database servers, including without limitation those commercially available from Oracle®, Microsoft®, Sybase®, IBM® and the like, which can process requests from database clients running on a computing device 104, 108, 112.

The web pages created by the server 114 and/or 116 may be forwarded to a computing device 104, 108, 112 via a web (file) server 114, 116. Similarly, the web server 114 may be able to receive web page requests, web services invocations, and/or input data from a computing device 104, 108, 112 (e.g., a user computer, etc.) and can forward the web page requests and/or input data to the web (application) server 116. In further embodiments, the server 116 may function as a file server. Although for ease of description, FIG. 1 illustrates a separate web server 114 and file/application server 116, those skilled in the art will recognize that the functions described with respect to servers 114, 116 may be performed by a single server and/or a plurality of specialized servers, depending on implementation-specific needs and parameters. The computer systems 104, 108, 112, web (file) server 114 and/or web (application) server 116 may function as the system, devices, or components described herein.

The environment 100 may also include a database 118. The database 118 may reside in a variety of locations. By way of example, database 118 may reside on a storage medium local to (and/or resident in) one or more of the computers 104, 108, 112, 114, 116. Alternatively, it may be remote from any or all of the computers 104, 108, 112, 114, 116, and in communication (e.g., via the network 110) with one or more of these. The database 118 may reside in a Storage-Area Network (SAN) familiar to those skilled in the art. Similarly, any necessary files for performing the functions attributed to the computers 104, 108, 112, 114, 116 may be stored locally on the respective computer and/or remotely, as appropriate. The database 118 may be a relational database, such as Oracle 20i®, that is adapted to store, update, and retrieve data in response to Structured Query Language (SQL) formatted commands.

Figure 2:
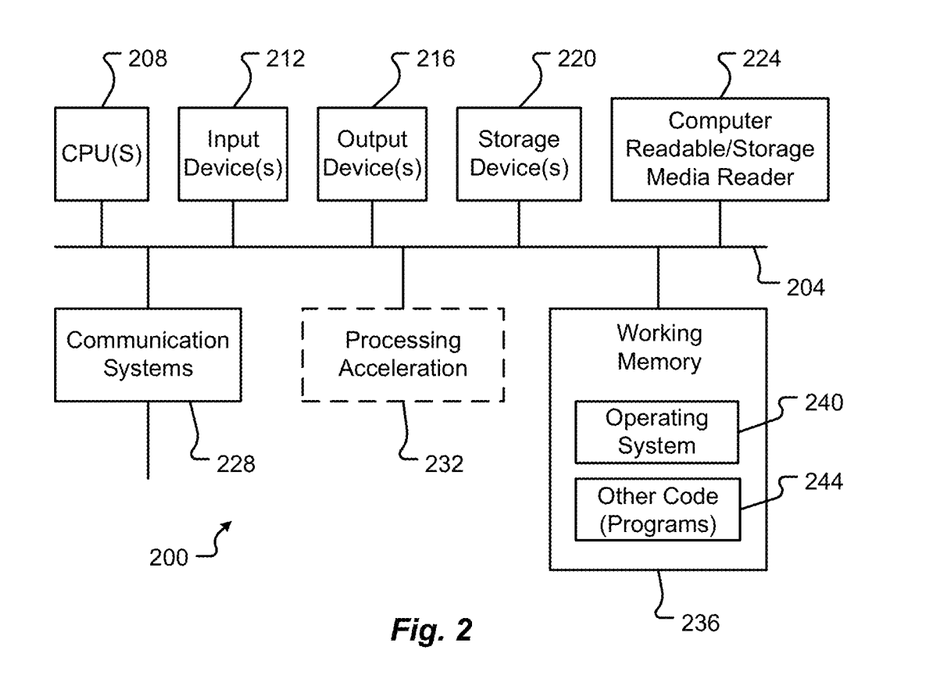
FIG. 2 is a block diagram illustrating elements of an exemplary computing device in which embodiments of the present disclosure may be implemented.

FIG. 2 is a block diagram illustrating elements of an exemplary computing device in which embodiments of the present disclosure may be implemented. More specifically, this example illustrates one embodiment of a computer system 200 upon which the servers, user computers, computing devices, or other systems or components described above may be deployed or executed. The computer system 200 is shown comprising hardware elements that may be electrically coupled via a bus 204. The hardware elements may include one or more Central Processing Units (CPUs) 208; one or more input devices 212 (e.g., a mouse, a keyboard, etc.); and one or more output devices 216 (e.g., a display device, a printer, etc.). The computer system 200 may also include one or more storage devices 220. By way of example, storage device(s) 220 may be disk drives, optical storage devices, solid-state storage devices such as a Random-Access Memory (RAM) and/or a Read-Only Memory (ROM), which can be programmable, flash-updateable and/or the like.

The computer system 200 may additionally include a computer-readable storage media reader 224; a communications system 228 (e.g., a modem, a network card (wireless or wired), an infra-red communication device, etc.); and working memory 236, which may include RAM and ROM devices as described above. The computer system 200 may also include a processing acceleration unit 232, which can include a Digital Signal Processor (DSP), a special-purpose processor, and/or the like.

The computer-readable storage media reader 224 can further be connected to a computer-readable storage medium, together (and, optionally, in combination with storage device(s) 220) comprehensively representing remote, local, fixed, and/or removable storage devices plus storage media for temporarily and/or more permanently containing computer-readable information. The communications system 228 may permit data to be exchanged with a network and/or any other computer described above with respect to the computer environments described herein. Moreover, as disclosed herein, the term "storage medium" may represent one or more devices for storing data, including ROM, RAM, magnetic RAM, core memory, magnetic disk storage mediums, optical storage mediums, flash memory devices and/or other machine-readable mediums for storing information.

The computer system 200 may also comprise software elements, shown as being currently located within a working memory 236, including an operating system 240 and/or other code 244. It should be appreciated that alternate embodiments of a computer system 200 may have numerous variations from that described above. For example, customized hardware might also be used and/or particular elements might be implemented in hardware, software (including portable software, such as applets), or both. Further, connection to other computing devices such as network input/output devices may be employed.

Examples of the processors 208 as described herein may include, but are not limited to, at least one of Qualcomm® Snapdragon® 800 and 801, Qualcomm® Snapdragon® 620 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARM926EJ-S™ processors, other industry-equivalent processors, and may perform computational functions using any known or future-developed standard, instruction set, libraries, and/or architecture.

Figure 3:
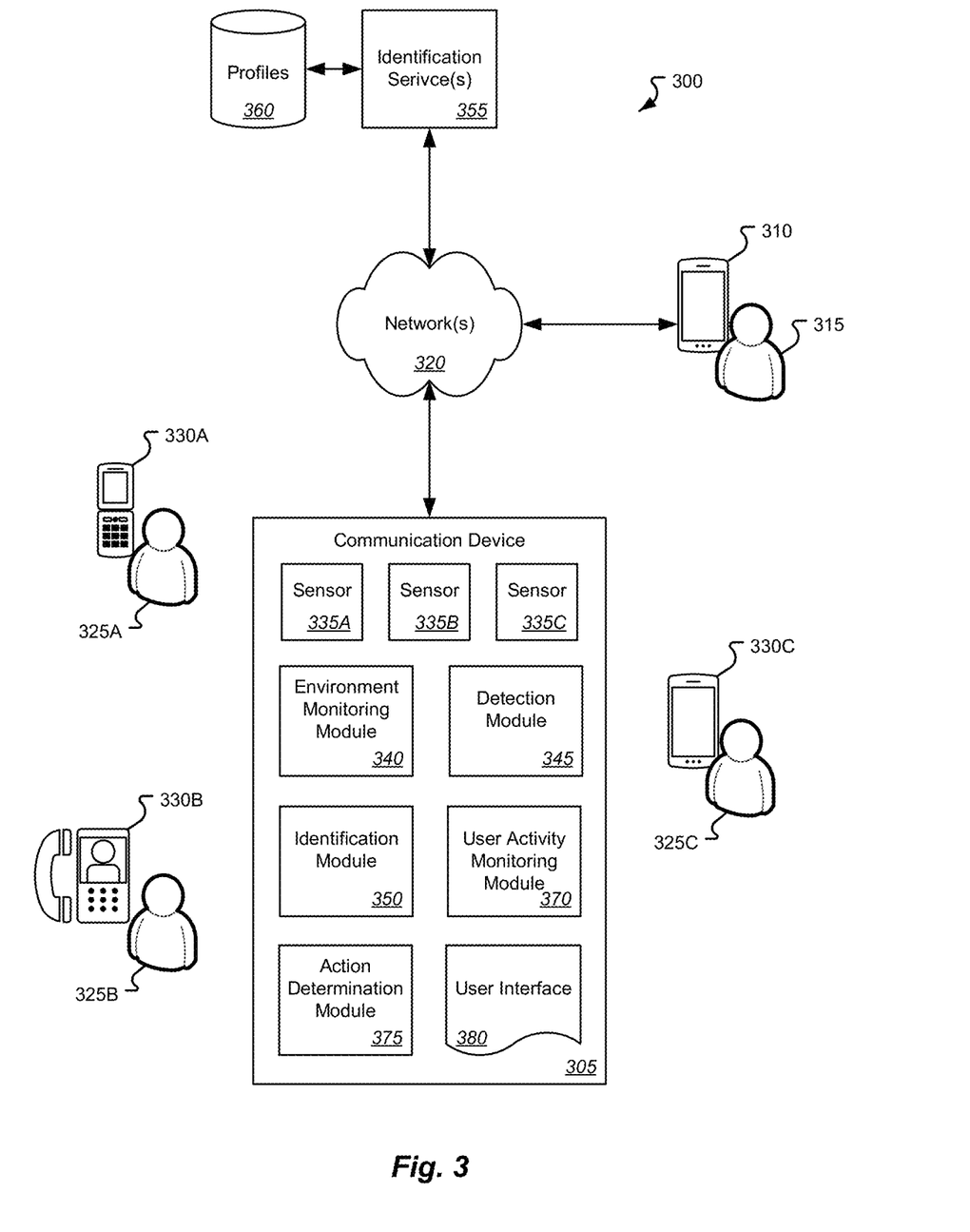
FIG. 3 is a block diagram illustrating an exemplary system for facilitating communications through a communication device according to one embodiment of the present disclosure.

FIG. 3 is a block diagram illustrating an exemplary system for facilitating communications through a communication device according to one embodiment of the present disclosure. As illustrated in this example, a system 300 can comprise a communication device 305 of a user. The communication device 305 can comprise, for example, a fixed or mobile telephone or a computing device adapted to support voice and/or video communication between the user and another device 310 associated with another party 325 over one or more communication networks 320. The communication networks can comprise one or more wired and/or wireless local and/or remote communication networks such as described above. Generally speaking, and as will be described below, the communication device 305 can be adapted to monitor and facilitate this communication by detecting and identifying resources, such as other persons, in the vicinity of the user of the communication device 305, determining actions that might be taken related to those resources based on the communication, and providing prompts for taking those actions if the user decides to do so.

Accordingly, the communication device 305 can comprise one or more environmental sensors 335A-335C. The one or more environmental sensors 335A-335C can comprise at least one sensor collecting biometric information. For example, a sensor 335A collecting biometric information can comprise a camera providing video or still images of an area around the communication device 305 and within a field of view of the camera. In another example, a sensor 335B collecting biometric information can additionally or alternatively comprise a microphone providing an audio stream including voices, if any, and other sounds from an area around the communication device 305 and within a detection range of the microphone. In addition to the sensor(s) 335A and/or 335B collecting biometric information, the one or more environmental sensors can optionally comprise other sensors 335C including, but not limited to, BluTooth, NFC, WiFi, and/or other wireless transceivers which can be used in combination with the sensors collecting biometric information to detect the presence of nearby devices.

An environment monitoring module 340 can receive and process the signals from the environmental sensors 335A-335C and a detection module 345 can detect a presence of one or more people 325A-325C based on the monitoring of the environmental sensors 335A-335C. For example, presences of a person 325A can be detected based on the audio stream containing signals that are indicative of a human voice. Additionally, or alternatively, the detection can be based on the images or video stream including portions including skin tones or features such as eyes and others typically used to recognize the presence of people within an image or frame of video. In some cases, the detection may also use, in conjunction with the input from the biometric sensors, input from other environmental sensors. For example, BluTooth, NFC, or WiFi signals from another device 330A-330C may confirm the presence of a person 325A-325C carrying that mobile device 330A-330C.

The detected one or more people can be identified by an identification module 370 of the communication device 305 based at least in part on input from the environmental sensors 335A-335C. It should be noted and understood that, while illustrated here as separate modules, the functions of the detection module 345 and the identification module 350 may be combined into one or more physical components and/or processes. In either case, identifying one or more people can comprise, for example, performing facial recognition on the video or still images. Using processes as known in the art, this processing can be performed by the mobile device 305 or may be performed in whole or in part by one or more remote servers or systems providing supporting identification services 355 to the mobile device 305. In another example, identifying one or more people can additionally or alternatively comprise performing voice recognition on the audio stream. Again, this processing can be performed, as known in the art, by the mobile device 305 or may be performed in whole or in part by one or more remote servers or systems providing supporting identification services 355 to the mobile device 305. In either case, identifying the person can comprise determining not only the identity of the individual but any number of other criteria that may be associated with that individual. For example, known persons can be associated with profiles 360 defining, among other possibilities, the individual's job title or responsibilities, skills or areas of expertise that individual may have, etc. Such processing can also be performed by the mobile device 305 or may be performed in whole or in part by one or more remote servers or systems providing supporting identification services 355 to the mobile device 305.

In some cases, a user activity motoring module 370 of the communication device 305 can also monitor activity of a user of the communication device 305. For example, the activity of the user of the communication device 305 can comprise an ongoing call or other communication with another person 315. In such examples, monitoring the activity of the user can comprise monitoring a status of that call, e.g., the length of time for the call, whether the call has been placed on hold, etc. Additionally, or alternatively, monitoring the activity of the user can comprise monitoring the conversation within that communication for certain keywords, performing semantic and/or sentiment analysis on the conversation, etc. as known in the art. A communication context for the user of the communication device 305 can be determined by the user activity monitoring module 370 based on monitoring the activity of the user of the communication device 305. For example, based on monitoring the communication, it may be determined that the user is talking to another person 315 about a certain product and/or a problem with that product. It may be further determined, such as by the call being placed on hold, that the user may require assistance or may want to communicate with someone else, e.g., a service representative with expertise in the product or topic of the conversation.

Accordingly, one or more possible actions related to communications through the communication device 305 can be determined by an action determination module 375 of the communication device 305 based on the identified one or more people, i.e., the people 325A-325C near the user that were previously detected and identified and the detection modules 345 and/or identification module 350. For example, the determined one or more possible actions related to communications through the communication device 305 can comprise initiating a call to at least one of the identified one or more people 325A through a device 330A associated with that person 32A, inviting at least one of the identified one or more people 325A to join a conference through the device 330A associated with that person 32A, or transferring a call to the device 330A associated with that person 32A. A user interface 380 including a prompt for at least one of the determined one or more possible actions related to communications through the communication device can then be provided to the user by the mobile device 305.

According to one embodiment, determining the one or more possible actions related to communications through the communication device 305 and providing the user interface 380 including the prompt for the at least one of the determined one or more possible actions can be further based on the determined communication context for the user of the communication device 305. For example, if the user context indicates that help may be needed to assist the user with a current call discussing a particular product and/or problem with that product and an identified person 325A nearby is known to have a skill or expertise related to that product and/or problem, the user may be provided through the user interface 380 with a prompt to call that identified person 325A, invite the identified person 325A to join the call, i.e., in a conference, or transfer the call to that identified person 325A.

As will be described below, this prompt can comprise a graphical, textual, audio, or combination thereof presentation of the action and/or instructions for carrying out that action. For example, the prompt can comprise a graphical button, graphical and/or textual link, or other element which the user can touch or otherwise select to case the indicated action, e.g., "conference Joe into this call," to be performed by the communication device 305 and/or a separate call controller (not shown here) as known in the art. In another example, the prompt can comprise a graphical, textual, and/or audio instruction, e.g., "Joe is in the room with you. Bump your phone to his to transfer this call to him."

Figure 4:
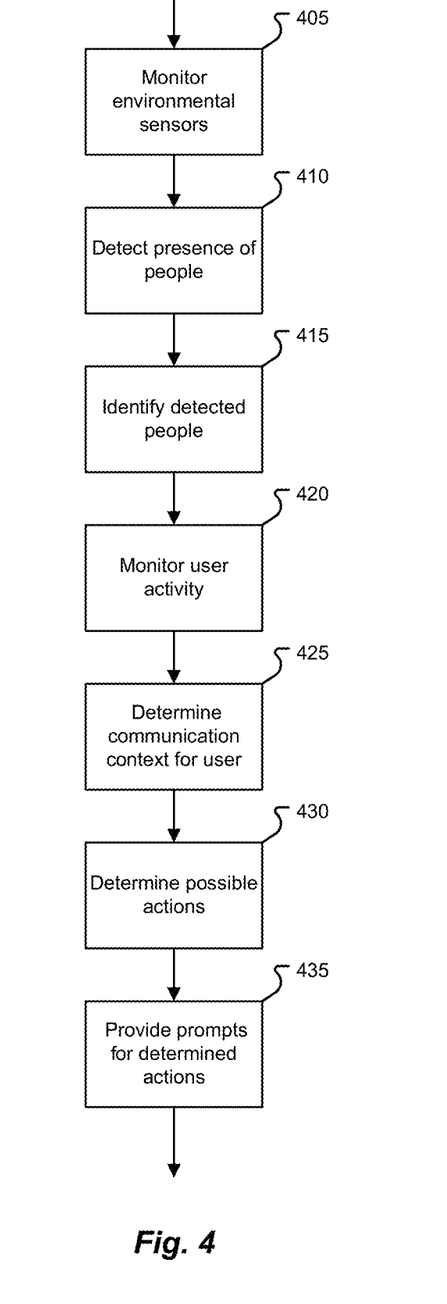
FIG. 4 is a flowchart illustrating an exemplary process for facilitating communications through a communication device according to one embodiment of the present invention.

FIG. 4 is a flowchart illustrating an exemplary process for facilitating communications through a communication device according to one embodiment of the present invention. As illustrated in this example, facilitating communications through a communication device can comprise monitoring 405 one or more environmental sensors of the communication device. As noted above, the one or more environmental sensors can comprise at least one sensor collecting biometric information. For example, the at least one sensor collecting biometric information can comprise a camera providing video or still images of an area around the communication device and within a field of view of the camera. In another example, the at least one sensor collecting biometric information can additionally or alternatively comprise a microphone providing an audio stream including voices, if any, and other sounds from an area around the communication device and within a detection range. In addition to the sensor(s) collecting biometric information, the one or more environmental sensors can optionally comprise other sensors including, but not limited to, BluTooth, NFC, WiFi, and/or other wireless transceivers which can be used in combination with the sensors collecting biometric information to detect the presence of nearby devices.

A presence of one or more people can be detected 410 by the communication device based on the monitoring 405 of the one or more environmental sensors. For example, presences of a person can be detected 410 based on the audio stream containing signals that are indicative of a human voice. Additionally, or alternatively, the detection 410 can be based on the images or video stream including portions including skin tones or features such as eyes and others typically used to recognize the presence of people within an image or frame of video. In some cases, the detection may also use, in conjunction with the input from the biometric sensors, input from other environmental sensors. For example, BluTooth, NFC, or WiFi signals from another device may confirm the presence of a person carrying a mobile device.

The detected 410 one or more people can be identified 415 by the communication device based at least in part on input from the one or more environmental sensors. For example, identifying 415 one or more people can comprise performing facial recognition on the video or still images. As described above, this processing can be performed by the mobile device or may be performed in whole or in part by one or more remote servers or systems providing supporting services to the mobile device. In another example, identifying 415 one or more people can additionally or alternatively comprise performing voice recognition on the audio stream. Again, this processing can be performed by the mobile device or may be performed in whole or in part by one or more remote servers or systems providing supporting services to the mobile device. In either case, identifying 415 the person can comprise determining not only the identity of the individual but any number of other criteria that may be associated with that individual. For example, known persons can be associated with profiles defining, among other possibilities, the individual's job title or responsibilities, skills or areas of expertise that individual may have, etc. Such processing can also be performed by the mobile device or may be performed in whole or in part by one or more remote servers or systems providing supporting services to the mobile device.

In some cases, the communication device can also monitor 420 activity of a user of the communication device. For example, the activity of the user of the communication device can comprise an ongoing call or other communication with another person. In such examples, monitoring 420 the activity of the user can comprise monitoring a status of that call, e.g., the length of time for the call, whether the call has been placed on hold, etc. Additionally, or alternatively, monitoring 420 the activity of the user can comprise monitoring the conversation within that communication for certain keywords, performing semantic and/or sentiment analysis on the conversation, etc. A communication context for the user of the communication device can be determined 425 based on monitoring 420 the activity of the user of the communication device. For example, based on monitoring 420 the communication, it may be determined 425 that the user is talking to another person about a certain product and/or a problem with that product. It may be further determined 425, such as by the call being placed on hold, that the user may require assistance or may want to communicate with someone else, e.g., a service representative with expertise in the product or topic of the conversation.

Accordingly, one or more possible actions related to communications through the communication device can be determined 430 by the communication device based on the identified 415 one or more people, i.e., the people near the user that were previously detected 410 and identified 415. For example, the determined 430 one or more possible actions related to communications through the communication device can comprise initiating a call to at least one of the identified one or more people, inviting at least one of the identified one or more people to join a conference, or transferring a call to at least one of the identified one or more people. A user interface including a prompt for at least one of the determined one or more possible actions related to communications through the communication device can then be provided 435.

Determining 430 the one or more possible actions related to communications through the communication device and providing 435 the user interface including the prompt for the at least one of the determined one or more possible actions can be further based on the determined communication context for the user of the communication device. For example, if the user context indicates that help may be needed to assist the user with a current call discussing a particular product and/or problem with that product and an identified person nearby is known to have a skill or expertise related to that product and/or problem, the user may be provided with a prompt to call that identified person, invite the identified person to join the call, i.e., in a conference, or transfer the call to that identified person.

Figure 5A:
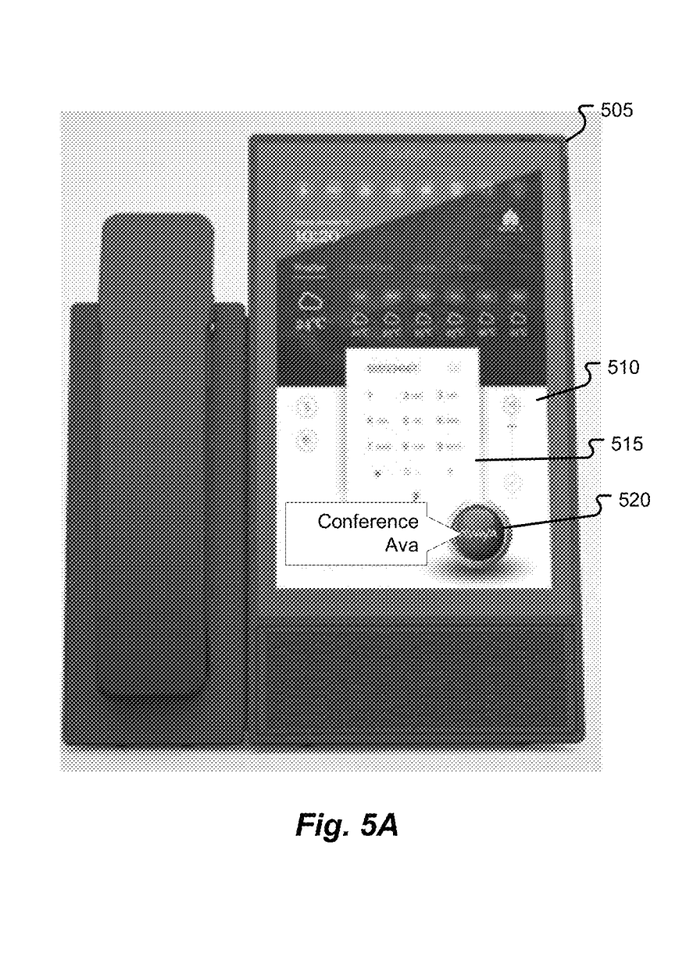
FIGS. 5A and 5B illustrate exemplary user interfaces for initiating or conducting communications through a communication device based on monitoring and analysis of surroundings of the communication device according to one embodiment of the present disclosure.
Figure 5B:
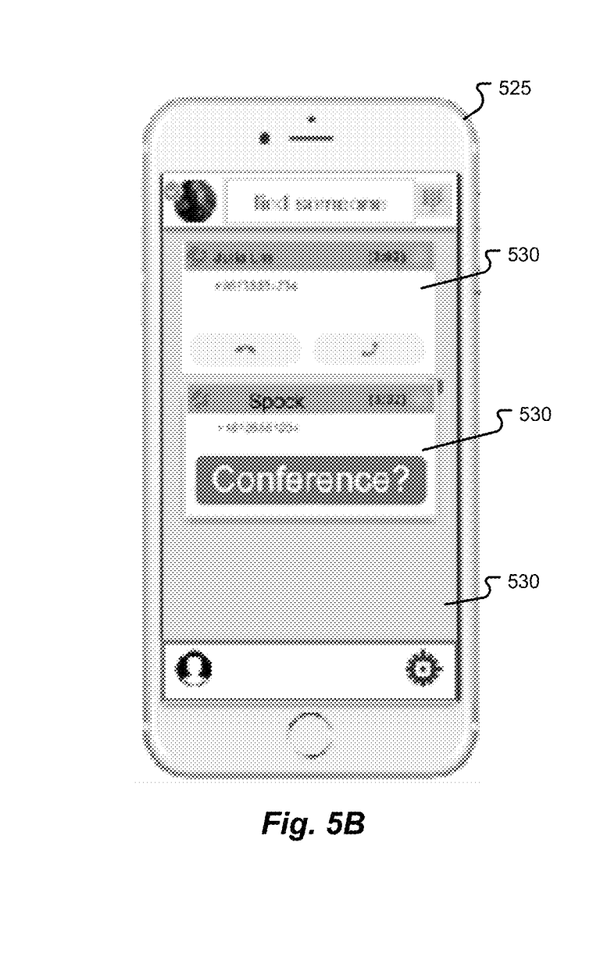

FIGS. 5A and 5B illustrate exemplary user interfaces for initiating or conducting communications through a communication device based on monitoring and analysis of surroundings of the communication device according to one embodiment of the present disclosure. More specifically, FIG. 5A illustrates an example of a telephone 505 such as an office phone typically used on a desk or at a workstation. The telephone 505 includes a display 510 for presenting a variety of information as known in the art. In some cases, this display 510 may comprise a touchscreen display for accepting touch gestures from a user interacting with the user interface presented thereon, e.g., a graphical representation of a keypad 515 which the user can touch to dial a number. As illustrated in this example, the display 510 can also include a graphical representation of a prompt 520 for at least one of the determined actions, e.g., adding an identified person to a conference. In response to the user touching or otherwise manipulating the user interface to indicate selection of the prompt, the determined action represented by that prompt can be initiated.

Similarly, FIG. 5B illustrates an example of a mobile phone 525 such as a cellphone. The mobile phone 525 includes a display 530 for presenting a variety of information as known in the art. In some cases, this display 530 may comprise a touchscreen display for accepting touch gestures from a user interacting with the user interface presented thereon, e.g., a dialog box 535 or other element indicating a current call. As illustrated in this example, the display 530 can also include a graphical representation of a prompt 540 for at least one of the determined actions, e.g., adding an identified person to a conference. In response to the user touching or otherwise manipulating the user interface to indicate selection of the prompt, the determined action represented by that prompt can be initiated.

It should be noted and understood that the user interfaces illustrated in FIGS. 5A and 5B and described above are offered by way of example only and are not intended to limit the scope of embodiments described herein. Rather, the user interfaces can vary significantly in both appearance and content without departing from the scope of the present disclosure. For example, while only one prompt is shown in each interface for the sake of simplicity, more than one prompt may be presented to represent options between more than one determined action. In other cases, instead of, or in addition to, the graphical representation of the prompts, audio prompts may be played instructing the user to perform some action, e.g., press the "1" key on the keypad, "bump" the phone or device of a nearby person, etc., to take the indicated determined action. Numerous other variations are contemplated and considered to be within the scope of the present invention.

The present disclosure, in various aspects, embodiments, and/or configurations, includes components, methods, processes, systems, and/or apparatus substantially as depicted and described herein, including various aspects, embodiments, configurations embodiments, sub-combinations, and/or subsets thereof. Those of skill in the art will understand how to make and use the disclosed aspects, embodiments, and/or configurations after understanding the present disclosure. The present disclosure, in various aspects, embodiments, and/or configurations, includes providing devices and processes in the absence of items not depicted and/or described herein or in various aspects, embodiments, and/or configurations hereof, including in the absence of such items as may have been used in previous devices or processes, e.g., for improving performance, achieving ease and\or reducing cost of implementation.

The foregoing discussion has been presented for purposes of illustration and description. The foregoing is not intended to limit the disclosure to the form or forms disclosed herein. In the foregoing Detailed Description for example, various features of the disclosure are grouped together in one or more aspects, embodiments, and/or configurations for the purpose of streamlining the disclosure. The features of the aspects, embodiments, and/or configurations of the disclosure may be combined in alternate aspects, embodiments, and/or configurations other than those discussed above. This method of disclosure is not to be interpreted as reflecting an intention that the claims require more features than are expressly recited in each claim. Rather, as the following claims reflect, inventive aspects lie in less than all features of a single foregoing disclosed aspect, embodiment, and/or configuration. Thus, the following claims are hereby incorporated into this Detailed Description, with each claim standing on its own as a separate preferred embodiment of the disclosure.

Moreover, though the description has included description of one or more aspects, embodiments, and/or configurations and certain variations and modifications, other variations, combinations, and modifications are within the scope of the disclosure, e.g., as may be within the skill and knowledge of those in the art, after understanding the present disclosure. It is intended to obtain rights which include alternative aspects, embodiments, and/or configurations to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A method for facilitating communications through a communication device, the method comprising:
   when the communication device is in an active communication session, detecting, by the communication device, an instruction to add another participant to the active communication session,
   in response to detecting the instruction to add the another participant to the active communication session, identifying, based on biometric information, individuals in a vicinity of the communication device;
   displaying a prompt to add at least one of the identified individuals to the active communication session;
   receiving user input indicating an individual of the identified individuals to be added to the active communication session; and
   adding a second communication device associated with the indicated individual of the identified individuals to the active communication session.

2. The method of claim 1, wherein the biometric information comprises one of: facial recognition or voice recognition.

3. The method of claim 2, further comprising:
   providing, by the communication device, a camera to perform the facial recognition and a microphone to perform the voice recognition.

4. A communication device comprising:
   a processor; and
   a memory coupled with and readable by the processor and storing therein a set of instructions which, when executed by the processor, causes the processor to facilitate communications through the communication device by:

when the communication device is in an active communication session, detecting, by the communication device, an instruction to add another participant to the active communication session;

in response to detecting the instruction to add the another participant to the active communication session, identifying, based on biometric information, individuals in a vicinity of the communication device;

displaying a prompt to add at least one of the identified individuals to the active communication session;

receiving user input indicating an individual of the identified individuals to be added to the active communication session; and adding a second communication device associated with the indicated individual of the identified individuals to the active communication session.

5. The communication device of claim 4, wherein the biometric information comprises one of: facial recognition or voice recognition.

6. The communication device of claim 5, wherein the set of instructions which, when executed by the processor, further cause the processor to:

perform the facial recognition using a camera in the communication device and perform the voice recognition using a microphone in the communication device.

7. A non-transitory, computer-readable medium comprising a set of instructions stored therein which, when executed by a processor, causes the processor to facilitate communications through a communication device by:

when the communication device is in an active communication session, detecting, by the communication device, an instruction to add another participant to the active communication session;

in response to detecting the instruction to add the another participant to the active communication session, identifying, based on biometric information, individuals in a vicinity of the communication device;

displaying a prompt to add at least one of the identified individuals to the active communication session;

receiving user input indicating an individual of the identified individuals to be added to the active communication session; and adding a second communication device associated with the indicated individual of the identified individuals to the active communication session.

8. The non-transitory, computer-readable medium of claim 7, wherein the biometric information comprises one of: facial recognition or voice recognition.

9. The non-transitory, computer-readable medium of claim 8, wherein the set of instructions which, when executed by the processor, further cause the processor to:

perform the facial recognition using a camera in the communication device and perform the voice recognition using a microphone in the communication device.

\* \* \* \* \*